United States Patent
Wu et al.

(10) Patent No.: US 8,810,165 B2
(45) Date of Patent: Aug. 19, 2014

(54) FAN CONTROL SYSTEM

(75) Inventors: Kang Wu, Shenzhen (CN); Bo Tian, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 88 days.

(21) Appl. No.: 13/564,775

(22) Filed: Aug. 2, 2012

(65) Prior Publication Data

US 2013/0038250 A1 Feb. 14, 2013

(30) Foreign Application Priority Data

Aug. 8, 2011 (CN) .......................... 2011 1 0225685

(51) Int. Cl.
*H02P 1/58* (2006.01)
*H02P 1/54* (2006.01)

(52) U.S. Cl.
CPC .................................... *H02P 1/54* (2013.01)
USPC ............. 318/102; 318/101; 318/34; 318/452

(58) Field of Classification Search
CPC ................ H02P 1/58; H02P 1/54; H02P 5/74
USPC .................................... 318/102, 452, 101, 34
See application file for complete search history.

(56) References Cited

U.S. PATENT DOCUMENTS 5,186,386 A * 2/1993 Lynch ............................. 236/11
6,400,045 B1 * 6/2002 Hosokawa et al. ........... 307/117

* cited by examiner

*Primary Examiner* — David Luo
(74) *Attorney, Agent, or Firm* — Novak Druce Connolly Bove + Quigg LLP

(57) ABSTRACT

A fan control system includes a fan and a fan control circuit. The fan control circuit includes a connector, a control unit, a switch unit, and a delay unit. The control unit is connected to the connector to receive a rotation speed control signal, and connected to the fan. The switch unit is connected to the connector to receive a voltage signal, and connected to the control unit. The delay unit is connected to the connector to receive the rotation speed control signal, and connected to the switch unit. When the delay unit receives the rotation speed control signal, the delay unit outputs a control signal to turn on the switch unit after a time delay, the voltage is transmitted to the control unit through the switch unit, the fan operates, the control unit controls rotation speed of the fan according to the rotation speed control signal.

14 Claims, 2 Drawing Sheets

FAN CONTROL SYSTEM

BACKGROUND

1. Technical Field

The present disclosure relates to a fan control system.

2. Description of Related Art

Many servers include multiple fans, which begin rotating at full speed at the moment the server starts up. The power consumed by the interior components of the server, such as motherboards, hard disk drives, and fans, can be up to a thousand kilowatts at start up, which may cause instability in the power supply to the server, and high power consumption.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
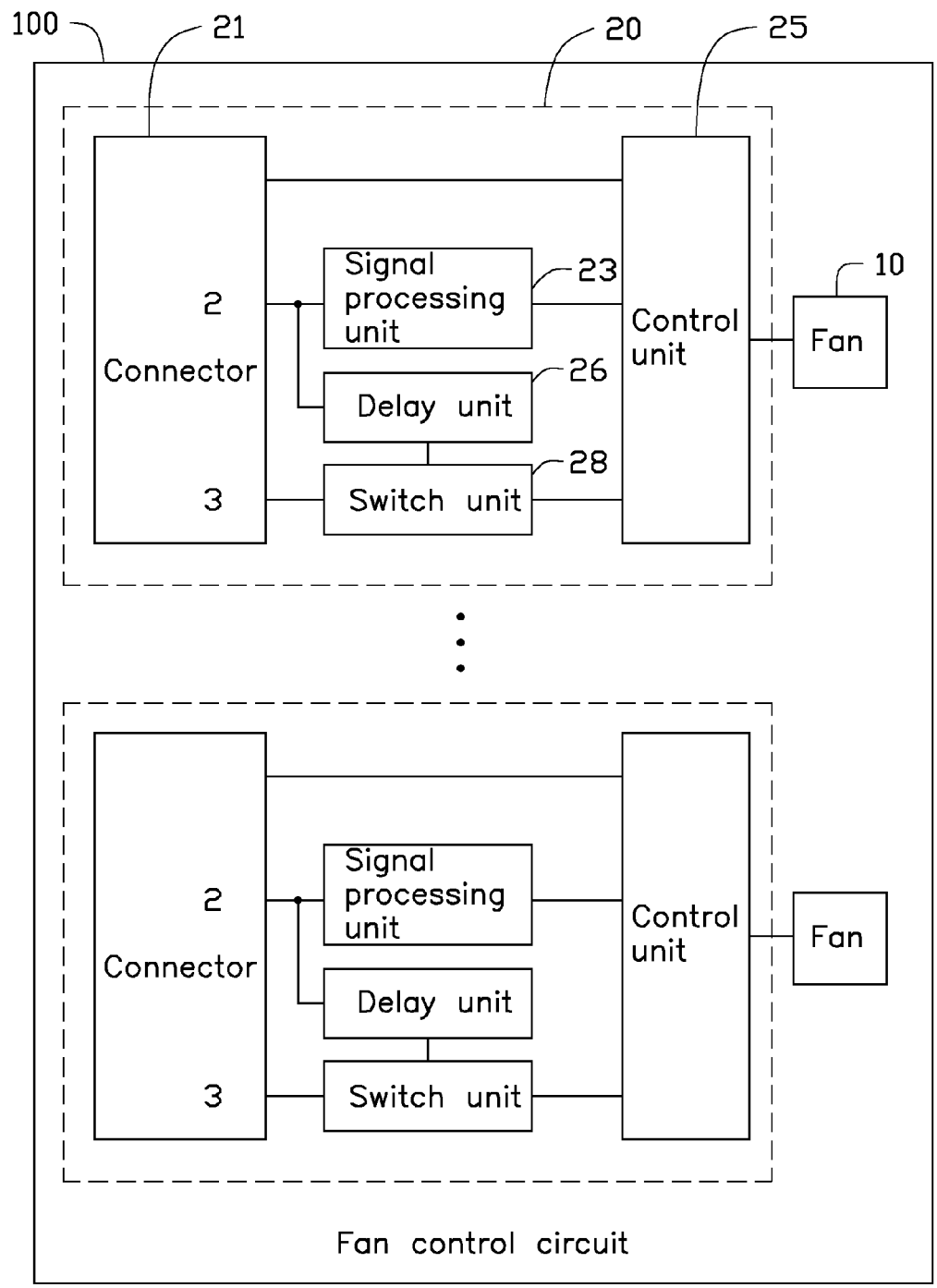
FIG. 1 is a block diagram of a fan control system in accordance with an exemplary embodiment of the present disclosure, wherein the fan control system includes a plurality of fan control circuits.

FIG. 1 is an exemplary embodiment of a fan control system 100 including a plurality of fan 10 and a plurality of fan control circuits 20 corresponding to the fans 10. Each fan control circuit 20 includes a connector 21, a signal processing unit 23, a control unit 25, a delay unit 26, and a switch unit 28. In one embodiment, the fan control system 100 is applied to a server.

The connector 21 includes a control pin 2 and a power pin 3. The connector 21 is connected to a fan controller of a motherboard of the server, to receive a rotation speed control signal, and further connected to a power supply of the motherboard of the server, to receive a voltage signal. The control pin 2 outputs the rotation speed control signal to the signal processing unit 23 and the delay unit 26. The power pin 3 outputs the voltage signal to the switch unit 28.

The signal processing unit 23 is connected to the control pin 2 of the connector 21, to receive the rotation speed control signal, and the control unit 25. The signal processing unit 23 is used to filter noise in the rotation speed control signal output by the control pin 2 of the connector 21, and output the rotation speed control signal with reduced noise to the control unit 25. In other embodiments, if the rotation speed control signal output by the control pin 2 of the connector 21 does not include noise, the signal processing unit 23 can be omitted.

The control unit 25 is used to control rotation speed of a corresponding fan 10 according to the rotation speed control signal received from the signal processing unit 23. The control unit 25 falls within well-known technologies, and is therefore not described here.

The delay unit 26 is connected to the control pin 2 of the connector 21 to receive the rotation speed control signal, and connected to the switch unit 28 to output a corresponding control signal to the switch unit 28. When the delay unit 26 does not receive the rotation speed control signal, the delay unit 26 outputs a first control signal to the switch unit 28. When the delay unit 26 receives the rotation speed control signal, the delay unit 26 outputs a second control signal to the switch unit 28 after a delay time.

The switch unit 28 is connected to the power pin 3 of the connector 21, the delay unit 26, and the control unit 25. When the switch unit 28 receives the first control signal, the switch unit 28 is turned off and does not transmit the voltage signal output by the power pin 3 to the control unit 25. A fan 10 connected to the control unit 25 does not operate. When the switch unit 28 receives the second control signal, the switch unit 28 is turned on and transmits the voltage signal output by the power pin 3 to the control unit 25. The fan 10 connected to the control unit 25 operates, and the control unit 25 controls the rotation speed of the fan 10.

Figure 2:
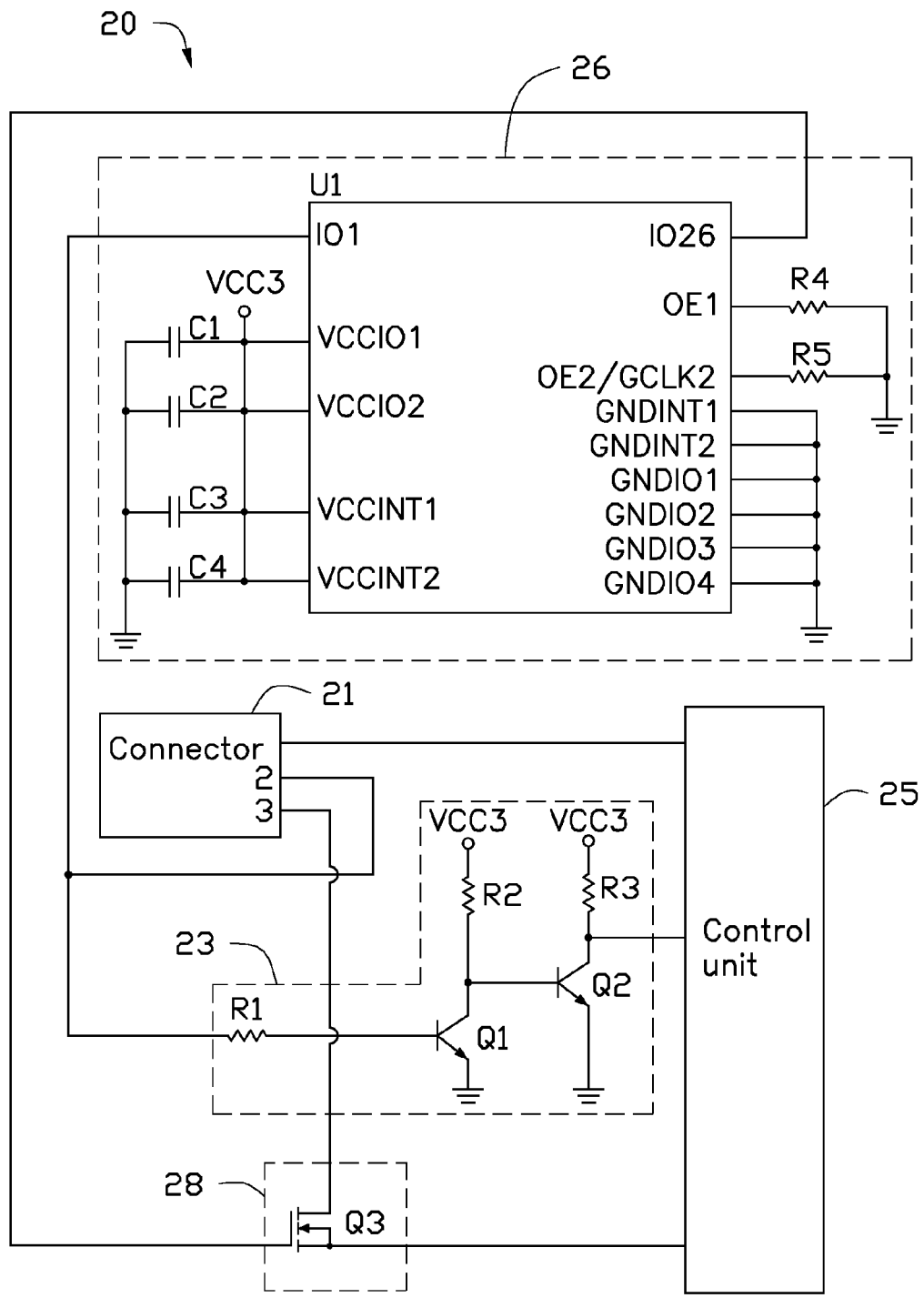
FIG. 2 is a circuit diagram of one of the fan control circuits of FIG. 1.

Referring to FIG. 2, the signal processing unit 23 includes three resistors R1-R3, and two electronic switches Q1 and Q2. A control terminal of the electronic switch Q1 is connected to the control pin 2 of the connector 21 through the resistor R1. A power terminal of the electronic switch Q1 is connected to a direct current (DC) power supply VCC through the resistor R2. A ground terminal of the electronic switch Q1 is grounded. A control terminal of the electronic switch Q2 is connected to the power terminal of the electronic switch Q1. A power terminal of the electronic switch Q2 is connected to the DC power supply VCC through the resistor R3, and connected to the control unit 25. A ground terminal of the electronic switch Q2 is grounded.

The delay unit 26 includes a programmable logic chip U1, four capacitors C1-C4, and two resistors R4 and R5. A signal terminal IO1 of the programmable logic chip U1 is connected to the control pin 2 of the connector 21 to receive the rotation speed control signal. A signal terminal IO26 of the programmable logic chip U1 is connected to the switch unit 28, to output control signals to the switch unit 28. Four power terminals VCCIO1, VCCIO2, VCCINT1, and VCCINT2 of the programmable logic chip U1 are connected to the DC power supply VCC. The power terminal VCCIO1 is grounded through the capacitor C1. The power terminal VCCIO2 is grounded through the capacitor C2. The power terminal VCCINT1 is grounded through the capacitor C3. The power terminal VCCINT2 is grounded through the capacitor C4. An enable terminal OE1 of the programmable logic chip U1 is grounded through the resistor R4. An enable terminal OE2/GCLK2 of the programmable logic chip U1 is grounded through the resistor R5. Six ground terminals GNDINT1, GNDINT2, GNDIO1, GNDIO2, GNDIO3, and GNDIO4 of the programmable logic chip U1 are grounded.

The programmable logic chip U1 is used to store a timing program to preset the delay time. When the signal terminal IO1 of the programmable logic chip U1 does not receive the rotation speed control signal, the signal terminal IO26 of the programmable logic chip U1 outputs the first control signal to the switch unit 28. When the signal terminal IO1 of the programmable logic chip U1 receives the rotation speed control signal, the signal terminal IO26 of the programmable logic chip U1 outputs the second control signal to the switch unit 28 after the delay time preset by the timing program.

The switch unit 28 includes an electronic switch Q3. A control terminal of the electronic switch Q3 is connected to the signal terminal IO26 of the programmable logic chip U1 to receive the control signals. A power terminal of the electronic switch Q3 is connected to the power pin 3 of the connector 21 to receive the voltage signal. An output terminal of the electronic switch Q3 is connected to the control unit 25.

At the moment of the server being started up, the control pin 2 of the connector 21 does not output the rotation speed control signal to the signal terminal IO1 of the programmable logic chip U1, the signal terminal IO26 of the programmable logic chip U1 outputs the first control signal to the control terminal of the electronic switch Q3, to turn off the electronic switch Q3. The voltage output by the power pin 3 of the connector 21 cannot be transmitted to the control unit 25 through the electronic switch Q3. The fan 30 connected to the control unit 25 does not operate.

When the control pin 2 of the connector 21 outputs the rotation speed control signal to the signal terminal IO1 of the programmable logic chip U1, the signal terminal IO26 of the programmable logic chip U1 outputs the second control signal to the control terminal of the electronic switch Q3 after the delay time preset by the timing program, to turn on the electronic switch Q3. The voltage output by the power pin 3 of the connector 21 is transmitted to the control unit 25 through the electronic switch Q3. The fan 30 connected to the control unit 25 operates. The control pin 2 of the connector 21 further outputs the rotation speed control signal to the control terminal of the electronic switch Q1. In one embodiment, the rotation speed control signal is a pulse width modulation (PWM) signal. When the control terminal of the electronic switch Q1 receives the PWM signal at a high level, the electronic switch Q1 is turned on, the electronic switch Q2 is turned off, the control unit 25 receives a high level signal from the power terminal of the electronic switch Q2. When the control terminal of the electronic switch Q1 receives the PWM signal at a low level, the electronic switch Q1 is turned off, the electronic switch Q2 is turned on, the control unit 25 receives a low level signal from the power terminal of the electronic switch Q2. Therefore, the PWM signal is transmitted to the control unit 25 through the signal processing unit 23, and noise in the PWM signal is filtered.

If the fan control system 100 includes a single fan control circuit 20 and a single fan 10, the delay time of the programmable logic chip U1 is preset. When the signal terminal IO1 of the programmable logic chip U1 receives the rotation speed control signal, the signal terminal IO26 of the programmable logic chip U1 outputs the second control signal to the control terminal of the electronic switch Q3 after the delay time, and the fan 30 begins to operate.

If the fan control system 100 includes first to third fan control circuits 20, the delay time T1, T2, and T3 of the programmable logic chips U1 of the first to third fan control circuits 20 are set to be different. In one embodiment, the delay time T1 is set be to the minimum of the delay time T1, T2, and T3, the delay time T2 is set be to the median of the delay time T1, T2, and T3, and the delay time T3 is set be to the maximum of the delay time T1, T2, and T3. When the control pins 2 of the connectors 21 of the first to third fan control circuits 20 output the rotation speed control signal, the signal terminals IO1 of the programmable logic chips U1 of the first to third fan control circuits 20 receive the rotation speed control signal at the same time. The signal terminal IO26 of the programmable logic chip U1 of the first fan control circuit 20 outputs the second control signal to the control terminal of the electronic switch Q3 of the first fan control circuit 20 after the delay time T1. The signal terminal IO26 of the programmable logic chip U1 of the second fan control circuit 20 outputs the second control signal to the control terminal of the electronic switch Q3 of the second fan control circuit 20 after the delay time T2. The signal terminal IO26 of the programmable logic chip U1 of the third fan control circuit 20 outputs the second control signal to the control terminal of the electronic switch Q3 of the third fan control circuit 20 after the delay time T3. Therefore, the fans 10 corresponding to the first to third fan control circuits 20 begin to operate at different time.

In another embodiment, the delay time T1 is set to be equal to the delay time T2, and to be less than the delay time T3. In this case, the fans 10 corresponding to the first and second fan control circuits 20 begin to operate at same time, and the fans 10 corresponding to the first to third fan control circuits 20 begin to operate at different time. As detailed above, it is can be seen that, according to presetting the delay time of the programmable logic chip U1 of each fan control circuit 20 to be different, the fans 10 corresponding to the fan control circuits 20 begin to operate at different time.

In one embodiment, the electronic switches Q1 and Q2 are npn bipolar junction transistors, the control terminal, the power terminal, and the ground terminal of each of the electronic switches Q1 and Q2 are a base, a collector, and an emitter of the npn bipolar junction transistor. The electronic switch Q3 is an n-channel metal-oxide semiconductor field-effect transistor (NMOSFET), the control terminal, the power terminal, and the output terminal of the electronic switch Q3 are a gate, a drain, and a source of the NMOSFET. In other embodiments, each of the electronic switches Q1 and Q2 may be a pnp bipolar junction transistor, or a MOSFET, or other switch having similar functions. The electronic switch Q3 may be a p-channel MOSFET, or a bipolar junction transistor, or other switch having similar functions.

As detailed above, the fans 10 of the fan control system 100 do not begin to operate at the moment the server is started up, according to employing the delay unit 26 in each fan control circuit 20. Therefore, the fan control system 100 is stable and energy-saving.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A fan control system, comprising:
   a fan; and
   a fan control circuit comprising:
      a connector comprising a control pin to output a rotation speed control signal, and a power pin to output a voltage signal;
      a control unit connected to the control pin of the connector to receive the rotation speed control signal, and connected to the fan;
      a switch unit connected to the power pin of the connector to receive the voltage signal, and connected to the control unit; and
      a delay unit connected to the control pin of the connector to receive the rotation speed control signal, and connected to the switch unit;
   wherein the delay unit outputs a first control signal to turn off the switch unit in response to the delay unit not receiving the rotation speed control signal, the voltage cannot be transmitted to the control unit through the switch unit, the fan does not operate; and
   wherein the delay unit outputs a second control signal to turn on the switch unit after a delay time in response to the delay unit receiving the rotation speed control signal, the voltage is transmitted to the control unit through the switch unit, the fan operates, the control unit controls rotation speed of the fan according to the rotation speed control signal.

2. The fan control system of claim 1, wherein the fan control circuit further comprises a signal processing unit, the control unit is connected to the control pin of the connector through the signal processing unit, the signal processing unit filters noise in the rotation speed control signal output by the control pin of the connector, and outputs the rotation speed control signal with reduced noise to the control unit.

3. The fan control system of claim 2, wherein the signal processing unit comprises:
first to third resistors;
a first electronic switch comprising:
a control terminal connected to the control pin of the connector through the first resistor;
a power terminal connected to a direct current (DC) power supply through the second resistor; and
a ground terminal grounded; and
a second electronic switch comprising:
a control terminal connected to the power terminal of the first electronic switch;
a power terminal connected to the DC power supply through the third resistor, and connected to the control unit; and
a ground terminal grounded.

4. The fan control system of claim 3, wherein each of the first and second electronic switches is an npn bipolar junction transistor, the control terminal, the power terminal, and the ground terminal of each of the first and second electronic switches are a base, a collector, and an emitter of the npn bipolar junction transistor.

5. The fan control system of claim 1, wherein the delay unit comprises:
first to fourth capacitors;
first and second resistors; and
a programmable logic chip comprising:
a first signal terminal connected to the control pin of the connector to receive the rotation speed control signal;
a second signal terminal connected to the switch unit;
a first power terminal connected to a direct current (DC) power supply, and grounded through the first capacitor;
a second power terminal connected to the DC power supply, and grounded through the second capacitor;
a third power terminal connected to the DC power supply, and grounded through the third capacitor;
a fourth power terminal connected to the DC power supply, and grounded through the fourth capacitor;
a first enable terminal grounded through the first resistor;
a second enable terminal grounded through the second resistor; and
first to sixth ground terminals grounded;
wherein the programmable logic chip stores a timing program to preset the delay time, the second signal terminal outputs the first control signal to turn off the switch unit in response to the first signal terminal not receiving the rotation speed control signal, the second signal terminal outputs the second control signal to turn on the switch unit after the delay time in response to the first signal terminal receiving the rotation speed control signal.

6. The fan control system of claim 1, wherein the switch unit comprises an electronic switch, the electronic switch comprises:
a control terminal connected to the delay unit to receive the first and second control signals;
a power terminal connected to the power pin of the connector to receive the voltage signal; and
an output terminal connected to the control unit;
wherein the electronic switch is turned off in response to the control terminal receiving the first control signal; and the electronic switch is turned on, the output terminal outputs the voltage signal to the control unit, in response to the control terminal receiving the second control signal.

7. The fan control system of claim 6, wherein the electronic switch is an n-channel metal-oxide semiconductor field-effect transistor (NMOSFET), the control terminal, the power terminal, and the output terminal of the electronic switch are a gate, a drain, and a source of the NMOSFET.

8. A fan control system, comprising:
a plurality of fans; and
a plurality of fan control circuits connected to the fans, wherein each fan control circuit controls rotation speed of a corresponding fan, and each fan control circuit comprises:
a connector comprising a control pin to output a rotation speed control signal, and a power pin to output a voltage signal;
a control unit connected to the control pin of the connector to receive the rotation speed control signal, and connected to a corresponding fan;
a switch unit connected to the power pin of the connector to receive the voltage signal, and connected to the control unit; and
a delay unit connected to the control pin of the connector to receive the rotation speed control signal, and connected to the switch unit;
wherein the delay unit outputs a first control signal to turn off the switch unit in response to the delay unit not receiving the rotation speed control signal, the voltage cannot be transmitted to the control unit through the switch unit, the corresponding fan does not operate; and
wherein the delay unit outputs a second control signal to turn on the switch unit after a delay time in response to the delay unit receiving the rotation speed control signal, the voltage is transmitted to the control unit through the switch unit, the corresponding fan operates, the control unit controls the rotation speed of the corresponding fan according to the rotation speed control signal; and
wherein the delay time of the delay unit of each fan control circuit is different, and the fans begin to work at different time.

9. The fan control system of claim 8, wherein each fan control circuit further comprises a signal processing unit, the control unit is connected to the control pin of the connector through the signal processing unit, the signal processing unit filters noise in the rotation speed control signal output by the control pin of the connector, and outputs the rotation speed control signal with reduced noise to the control unit.

10. The fan control system of claim 9, wherein the signal processing unit comprises:
first to third resistors;
a first electronic switch comprising:
a control terminal connected to the control pin of the connector through the first resistor;
a power terminal connected to a direct current (DC) power supply through the second resistor; and
a ground terminal grounded; and a second electronic switch comprising:
   a control terminal connected to the power terminal of the first electronic switch;
   a power terminal connected to the DC power supply through the third resistor, and connected to the control unit; and
   a ground terminal grounded.

11. The fan control system of claim 10, wherein each of the first and second electronic switches is an npn bipolar junction transistor, the control terminal, the power terminal, and the ground terminal of each of the first and second electronic switches are a base, a collector, and an emitter of the npn bipolar junction transistor.

12. The fan control system of claim 8, wherein the delay unit comprises:
   first to fourth capacitors;
   first and second resistors; and
   a programmable logic chip comprising:
      a first signal terminal connected to the control pin of the connector to receive the rotation speed control signal;
      a second signal terminal connected to the switch unit;
      a first power terminal connected to a direct current (DC) power supply, and grounded through the first capacitor;
      a second power terminal connected to the DC power supply, and grounded through the second capacitor;
      a third power terminal connected to the DC power supply, and grounded through the third capacitor;
      a fourth power terminal connected to the DC power supply, and grounded through the fourth capacitor;
      a first enable terminal grounded through the first resistor;
      a second enable terminal grounded through the second resistor; and
      first to sixth ground terminals grounded;
   wherein the programmable logic chip stores a timing program to preset the delay time, the second signal terminal outputs the first control signal to turn off the switch unit in response to the first signal terminal not receiving the rotation speed control signal, the second signal terminal outputs the second control signal to turn on the switch unit after the delay time in response to the first signal terminal receiving the rotation speed control signal.

13. The fan control system of claim 8, wherein the switch unit comprises an electronic switch, the electronic switch comprises:
   a control terminal connected to the delay unit to receive the first and second control signals;
   a power terminal connected to the power pin of the connector to receive the voltage signal; and
   an output terminal connected to the control unit;
   wherein the electronic switch is turned off in response to the control terminal receiving the first control signal; and the electronic switch is turned on in response to the control terminal receiving the second control signal, the output terminal outputs the voltage signal to the control unit.

14. The fan control system of claim 13, wherein the electronic switch is an NMOSFET, the control terminal, the power terminal, and the output terminal of the electronic switch are a gate, a drain, and a source of the NMOSFET.

* * * * *